United States Patent
Gao et al.

(10) Patent No.: US 10,534,192 B2
(45) Date of Patent: Jan. 14, 2020

(54) STEREO DISPLAY PANEL AND DISPLAY DEVICE HAVING THE STEREO DISPLAY PANEL

(71) Applicant: BOE TECHNOLOGY GROUP CO., LTD., Beijing (CN)

(72) Inventors: Jian Gao, Beijing (CN); Xiaochuan Chen, Beijing (CN); Yafeng Yang, Beijing (CN); Can Zhang, Beijing (CN); Wei Wang, Beijing (CN); Xinli Ma, Beijing (CN); Jifeng Tan, Beijing (CN); Can Wang, Beijing (CN); Qian Wang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 142 days.

(21) Appl. No.: 15/679,026

(22) Filed: Aug. 16, 2017

(65) Prior Publication Data
US 2018/0120576 A1 May 3, 2018

(30) Foreign Application Priority Data
Oct. 31, 2016 (CN) .......................... 2016 1 0930981

(51) Int. Cl.
*G02B 27/22* (2018.01)

(52) U.S. Cl.
CPC ................................ *G02B 27/2242* (2013.01)

(58) Field of Classification Search
CPC .................................................. G02B 27/2242
USPC .......................................................... 349/15
See application file for complete search history.

(56) References Cited

U.S. PATENT DOCUMENTS

2008/0231952 A1 9/2008 Kim
2015/0015816 A1* 1/2015 Bae .................. G02B 26/08
349/15

FOREIGN PATENT DOCUMENTS

| CN | 10127119 A | 9/2008 |
|---|---|---|
| CN | 104460115 A | 3/2015 |
| CN | 105629491 A | 6/2016 |
| CN | 105954883 A | 9/2016 |
| CN | 106291958 A | 1/2017 |
| CN | 206115049 U | 4/2017 |

(Continued)

OTHER PUBLICATIONS

Third Chinese Office Action, for Chinese Patent Application No. 201610930981.9, dated Nov. 1, 2017, 8 pages.
(Continued)

*Primary Examiner* — Thanh Nhan P Nguyen
(74) *Attorney, Agent, or Firm* — Kinney & Lange, P.A.

(57) ABSTRACT

A stereo display panel is disclosed. The stereo display panel has: a collimated light display structure having first and second display regions configured to display left-eye and right-eye images respectively; and a light-redirecting structure disposed on a light exit surface of the collimated light display structure. The light-redirecting structure has a first portion and a second portion to deflect collimated light beams exiting from the first and second display regions towards predetermined left-eye viewing position and right-eye viewing position respectively, such that left-eye and right-eye virtual images seen by left and right eyes are located at a light incidence side of the collimated light display structure. A stereo display device having the stereo display panel is also disclosed.

18 Claims, 4 Drawing Sheets

(56) References Cited

FOREIGN PATENT DOCUMENTS

WO    2015018941 A1    2/2015

OTHER PUBLICATIONS

Chinese Search Report dated Feb. 28, 2017, for corresponding Chinese Application No. 201610930981.9.
Second Chinese Office Action dated Aug. 15, 2017, for corresponding Chinese Application No. 201610930981.9.
First Chinese Office Action dated Apr. 27, 2017, for corresponding Chinese Application No. 201610930981.9.

* cited by examiner

STEREO DISPLAY PANEL AND DISPLAY DEVICE HAVING THE STEREO DISPLAY PANEL

CROSS-REFERENCE TO RELATED APPLICATION

This application claims the benefit of Chinese Patent Application No. 201610930981.9 filed on Oct. 31, 2016 in the State Intellectual Property Office of China, the whole disclosure of which is incorporated herein by reference.

TECHNICAL FIELD

The present disclosure relates to the field of display technology, and especially to a stereo display panel and a display panel having such stereo display panel.

BACKGROUND

Figure 1:
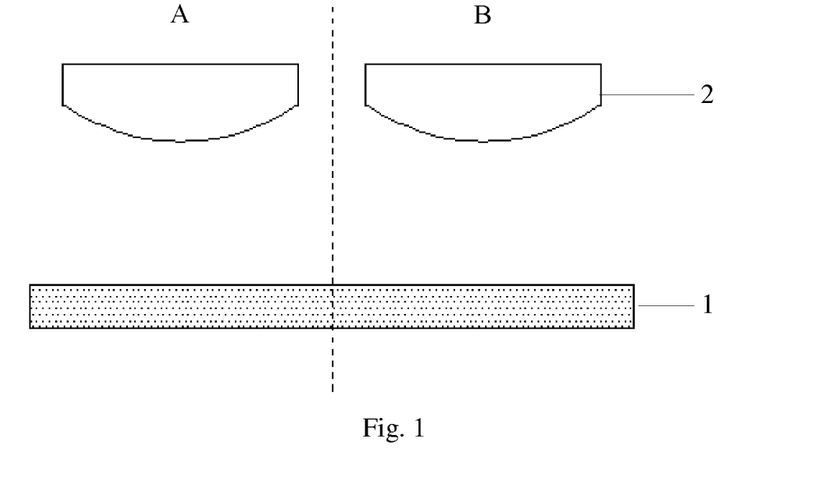
FIG. 1 is an illustrative structural drawing, showing an existing stereo display panel.
Figure 2:
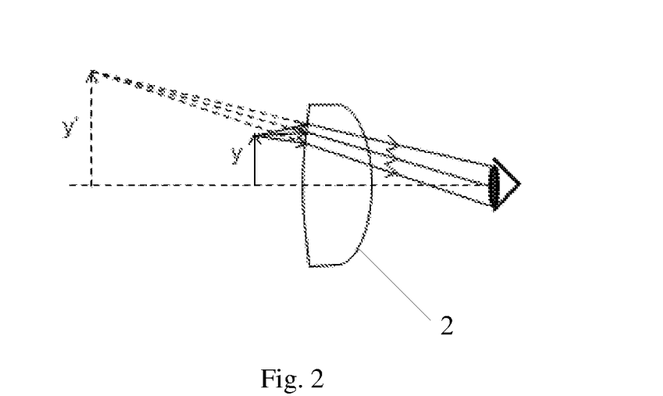
FIG. 2 is an illustrative drawing, showing how to realize virtual imaging by an existing stereo display panel.

As shown in FIG. 1, an existing flat virtual display panel is achieved by disposing two positive lenses 2 in a left-eye display region A and a right-eye display region B in front of a display screen 1 respectively, and a focal distance of each positive lens 2 needs to be larger than a distance from the display screen 1 to the positive lens 2, such that the positive lens 2 acts as a magnifier. A principle of the magnifying function of the positive lens 2 is shown in FIG. 2. In FIG. 2, an image y displayed by the display screen 1 is refracted by the positive lens 2, such that a viewer's eyes may see a magnified positive virtual image y'. The virtual image seen by a left eye and a virtual image seen by a right eye are combined in the viewer's brain so as to generate a stereo visual effect.

In the above described method of achieving the flat virtual display, two positive lenses 2 are needed. However, the positive lenses 2 are thick and heavy, and each positive lens 2 used as a single lens may introduce an optical aberration, which makes the viewer uncomfortable in wearing the virtual display device and in watching a displayed picture, and it is inconvenient for the viewer to watch this virtual display device with his/her eyes being located near to the device.

Therefore, an urgent technical problem to be solved in this technical field is to achieve a flat virtual image display without using any positive lens.

SUMMARY

In order to at least partially overcome the above mentioned defects, an object of the present disclosure is to provide a stereo display panel and a display device having the stereo display panel to achieve stereo image display that is suitable for watching at a close distance.

According to one aspect of the present disclosure, a stereo display panel is provided.

In an exemplary embodiment, the stereo display panel may comprise: a collimated light display structure having a first display region configured to display a left-eye image and a second display region configured to display a right-eye image; and a light-redirecting structure disposed on a light exit surface of the collimated light display structure. The light-redirecting structure may comprise: a first portion corresponding to the first display region and configured to deflect a collimated light beam exiting from the first display region towards a predetermined left-eye viewing position, such that a left-eye virtual image seen by a left eye is located at a light incidence side of the collimated light display structure; and a second portion corresponding to the second display region and configured to deflect a collimated light beam exiting from the second display region towards a predetermined right-eye viewing position, such that a right-eye virtual image seen by a right eye is located at the light incidence side of the collimated light display structure.

In another exemplary embodiment, the collimated light display structure may comprise a plurality of physical pixels, and at least two of the physical pixels are configured to provide one virtual pixel of the left-eye virtual image or the right-eye virtual image.

In a further exemplary embodiment, every three physical pixels may be configured to provide one virtual pixel, and connecting lines connecting centers of every two of the three physical pixels form a triangle.

In a still further exemplary embodiment, the light-redirecting structure may comprise a plurality of right angle prisms arranged into an array, each of the physical pixels corresponds to at least one of the plurality of right angle prisms, and a right-angle side of each right angle prism abuts against the light exit surface of the collimated light display structure.

In a still further exemplary embodiment, each of the right angle prisms satisfies the following equations:

$$\alpha = \theta_2 - \theta_1, \text{ and}$$

$$n \sin \theta_1 = \sin \theta_2,$$

where $\theta_1$ is an included angle between a slope surface of the right angle prism and the light exit surface of the collimated light display structure, $\alpha$ is a deflection angle of the collimated light beam, $\theta_2$ is an included angle between the direction of the light beam coming out of the slope surface of the right angle prism and the slope surface of the right angle prism, and n is a refractivity of the material of the right angle prism.

In a still further exemplary embodiment, the collimated light display structure may comprise a collimated backlight source and a light adjusting structure disposed at a light exit side of the collimated backlight source.

In a still further exemplary embodiment, the direction of the collimated light beam emitted from the collimated backlight source may be perpendicular to a plane in which the light adjusting structure lies.

In a still further exemplary embodiment, the light adjusting structure may be a liquid crystal panel.

In a still further exemplary embodiment, the collimated light display structure may comprise a flat display panel and a collimating structure disposed on a light exit side of the flat display panel, and the collimating structure is configured to collimate light emitted from the flat display panel.

In a still further exemplary embodiment, the direction of the collimated light beam emitted from the collimating structure may be perpendicular to a plane in which the flat display panel lies.

In a still further exemplary embodiment, the flat display panel may comprise any one of an electroluminescent display panel, a plasma display panel and an electronic paper.

According to another aspect of the present disclosure, there is provided a display device.

In an exemplary embodiment, the display device may comprise a stereo display panel according to any one of the above embodiments.

BRIEF DESCRIPTION OF THE DRAWINGS

The above and other features of the present disclosure will become more apparent by describing in detail exemplary embodiments thereof with reference to the accompanying drawings, in which.

DETAILED DESCRIPTION OF EMBODIMENTS

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

Figure 3:
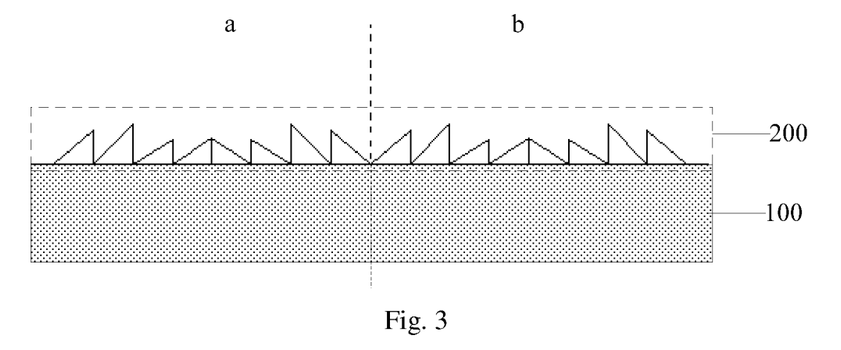
FIG. 3 is an illustrative structural drawing, showing a stereo display panel according to an exemplary embodiment of the present disclosure.

FIG. 3 shows a stereo display panel according to an exemplary embodiment of the present disclosure. As shown in FIG. 3, the stereo display panel comprises: a collimated light display structure 100 and a light-redirecting structure 200 disposed on a light exit surface of the collimated light display structure 100. The collimated light display structure 100 has a first display region a configured to display a left-eye image and a second display region b configured to display a right-eye image. The light-redirecting structure 200 comprises a first portion and a second portion, the first portion is corresponding to (for example, aligned with) the first display region a and configured to deflect a collimated light beam exiting from the first display region a towards a predetermined left-eye viewing position, such that a virtual image seen by a left eye is located at a light incidence side of the collimated light display structure 100; and the second portion is corresponding to (for example, aligned with) the second display region b and configured to deflect a collimated light beam exiting from the second display region b towards a predetermined right-eye viewing position, such that a virtual image seen by a right eye is located at the light incidence side of the collimated light display structure 100.

Through providing the light-redirecting structure 200 having a suitable configuration (which will be described hereinafter), a left eye virtual image and a right eye virtual image can be located behind a real image displayed by the collimated light display structure 100, then the left eye virtual image seen by the left eye and the right eye virtual image seen by the right eye may be combined in the brain to achieve a stereo visual effect. In this way, since the virtual image is further away from human's eyes than from the display structure, a stereo visual effect can be achieved even if the eyes is relative nearer to the collimated light display structure. Moreover, since an existing positive lens, which is thick and heavy, is replaced by the light-redirecting structure 200 disposed on the light exit surface of the collimated light display structure 100 to achieve the stereo display, the stereo display panel as a whole can be thinner.

In practice, generally, viewing positions of a viewer's left eye and right eye in front of the collimated light display structure are set based on pupillary distance of the viewer. Therefore, the viewing positions of the left eye and the right eye may be preset based on the pupillary distance. For example, an average pupillary distance of ordinary people may be selected as a basis for presetting the viewing positions of the left eye and the right eye. For example, in a virtual reality helmet type display device, a distance between a viewer's eyes to a screen is generally fixed, their relative positions would not change, and the viewer is usually located in front of the stereo display panel, therefore, the first display region a and the second display region b are usually disposed symmetrically. To be noted, the first display region a and the second display region b may be disposed in various ways. In the example shown in FIG. 3, the first display region a and the second display region b may be symmetrical about a central line of the collimated light display structure 100; in another example, the collimated light display structure 100 may also include a plurality of first display regions and a plurality of second display regions that are arranged alternately. In a further example, a plurality of first display regions and a plurality of second display regions may be disposed staggered, like a chessboard. The following detailed description is based on the embodiment shown in FIG. 3.

Figure 4A:
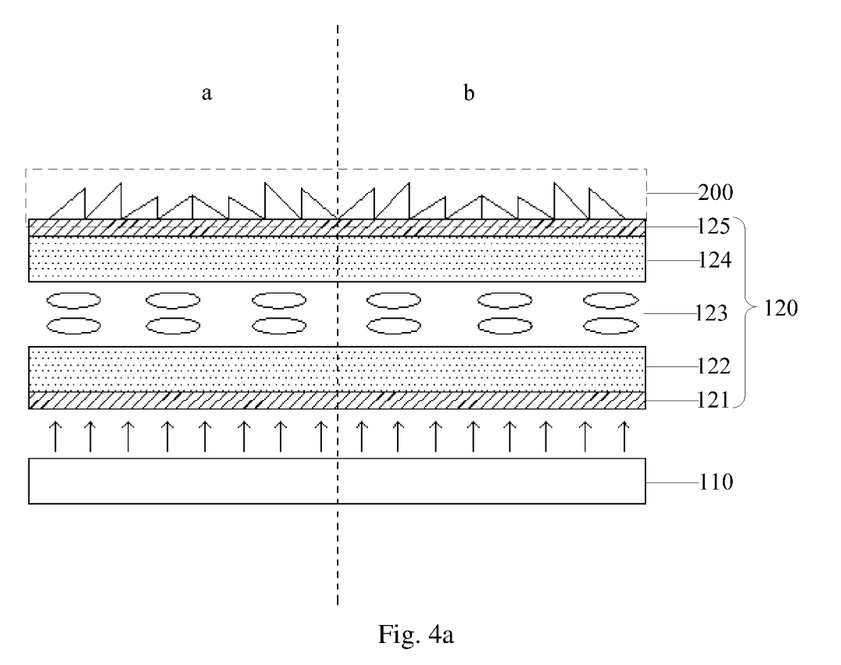
FIG. 4a is an illustrative structural drawing, showing a stereo display panel according to another exemplary embodiment of the present disclosure.

As shown in FIG. 4a, specifically, the collimated light display structure 100 may include: a collimated backlight source 110, and a light adjusting structure 120 disposed at a light exit side of the collimated backlight source 110 and having a display function without changing a direction of light, that is, light coming out of the light adjusting structure 120 is still collimated light.

In one embodiment, a direction of the collimated light coming out of the collimated backlight source 110 is perpendicular to the plane in which the light adjusting structure 120 lies, so as to achieve a better display performance. In another embodiment, the collimated light may be transmitted into the light adjusting structure 120 in a non-vertical direction with respect to the plane of the light adjusting structure 120.

According to an exemplary embodiment, as shown in FIG. 4a, the light adjusting structure 120 may be embodied by a liquid crystal panel, which may adjust an intensity of light coming out of the liquid crystal panel so as to perform display. The liquid crystal panel may include: a lower polarizer 121, a lower substrate 122, a liquid crystal layer 123, an upper substrate 124, an upper polarizer 125 and other basic components.

Figure 4B:
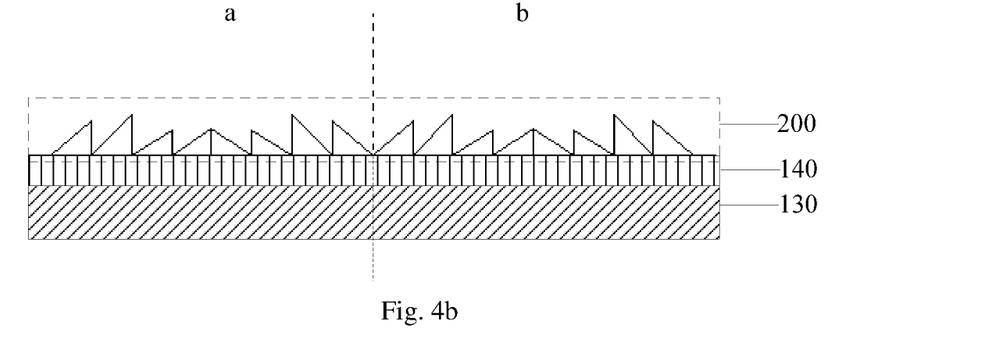
FIG. 4b is an illustrative structural drawing, showing a stereo display panel according to a further exemplary embodiment of the present disclosure.

In another exemplary embodiment, as shown in FIG. 4b, the collimated light display structure 100 may specifically include: a flat display panel 130; and a collimating structure 140 disposed at a light exit side of the flat display panel 130 and configured to collimate the light emitted from the flat display panel 130.

In an example, collimated light emitted from the collimating structure 140 is perpendicular to the plane in which the flat display panel 130 lies, so as to achieve a better display performance. In another embodiment, the emitted collimated light may not be perpendicular to the plane in which the light adjusting structure 120 lies.

The flat display panel 130 may include an electroluminescent display panel, a plasma display panel, an electronic paper or the like. The flat display panel 130 may be in a form of a combination of a liquid crystal panel and a backlight module.

According to an exemplary embodiment, as shown in FIG. 3, the light-redirecting structure 200 may be consisted of a plurality of right angle prisms arranged into an array, and each physical pixel of the collimated light display structure 100 corresponds to at least one of the right angle prisms. A right-angle side of each right angle prism abuts on the light exit surface of the collimated light display structure 100. It can be understood, a method of manufacturing a right angle prism is simpler than manufacturing a lens, and the light-redirecting structure 200 consisted of a plurality of right angle prism is lighter and thinner than a lens, which facilitates making the whole device lighter and thinner and lowering cost.

In an example, one physical pixel (or sub-pixel) is corresponding to one right angle prism of the plurality of right angle prisms. Moreover, inverted extension lines of light emitted from at least two pixels and having been refracted by the prisms have an intersection point, such that virtual pixels can be seen by human's eyes. Therefore, right angle prisms corresponding to the physical pixels have different sizes and parameters. The following description is based on an example of one physical pixel corresponding to one right angle prism.

Figure 5:
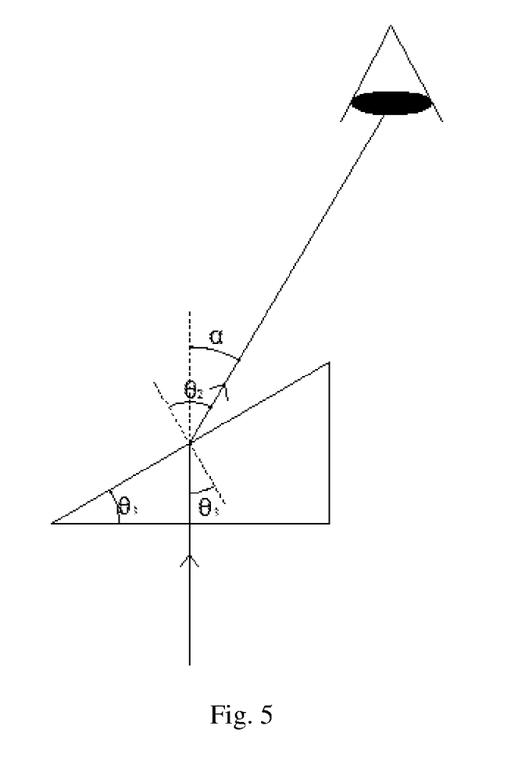
FIG. 5 is an illustrative drawing, showing a principle of light deflection by a right angle prism according to an embodiment of the present disclosure.

In the virtual display panel provided according to the embodiments of the present disclosure, each of the right angle prisms forming the light-redirecting structure 200 follows the refraction law. As shown in FIG. 5, a deflection angle of a collimated light beam after passing through the right angle prism and a slope angle of the right angle prism satisfy the following equations:

$\alpha = \theta_2 - \theta_1$; and $n \sin \theta_1 = \sin \theta_2$;

Where $\theta_1$ is the slope angle of the right angle prism, i.e., an included angle between a plane in which the slope surface of the right angle prism lies and a plane in which a light exit surface of the collimated light display structure lies, which is also an incident angle of the collimated light beam with respect to the slope surface, $\alpha$ is a deflection angle of the collimated light beam, $\theta_2$ is an included angle between the light beam coming out of the slope surface of the right angle prism and the slope surface of the right angle prism, i.e., a refraction angle of the collimated light beam after passing through the slope surface of the right angle prism, and n is refractivity (refractive index) of the material of the right angle prism.

In practice, given that different deflection angles of light exiting from different physical pixels, which are needed for the light to be transmitted to the viewer's eyes, are known, slope angles of right angle prisms corresponding to the physical pixels respectively can be calculated. Moreover, an inclining direction of the slope surface of each right angle prism is determined based on the positions of the viewer's eyes. The situations shown in the drawings are only illustrative.

Figure 6:
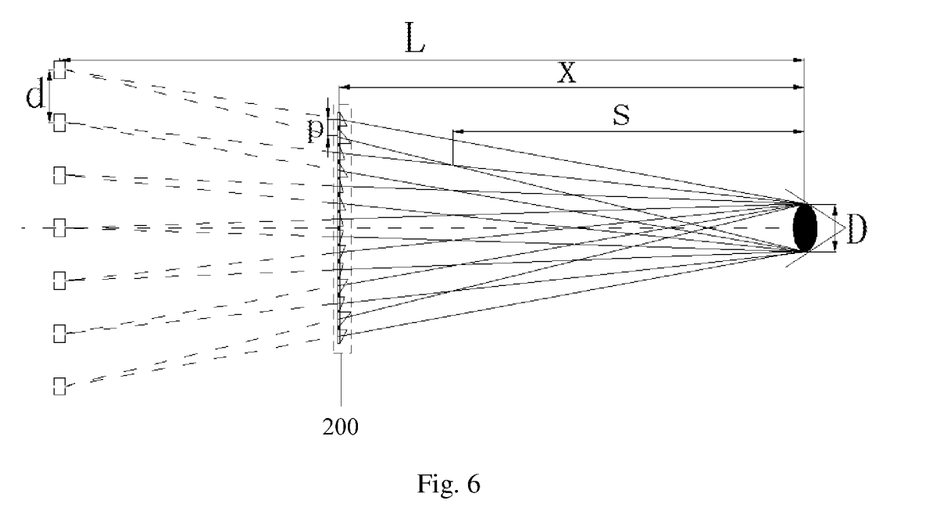
FIG. 6 is an illustrative drawing, showing a principle of stereo imaging of a stereo display panel according to an embodiment of the present disclosure.

In order to make sure that the virtual image seen by the viewer's eyes is located behind the real image displayed by the collimated light display structure 100 and located at the light incidence side of the collimated light display structure, the number of the physical pixels needs to be larger than the number of the virtual pixels. Generally, at least two physical pixels of the collimated light display structure 100 are used to provide displayed content of one virtual pixel. In practice, the number of the physical pixels (i.e., actual pixels of the collimating structure) is generally two, three or more times of the number of the virtual pixels (i.e., the virtual pixels forming the virtual image). FIG. 6 shows that two physical pixels form a structure for displaying the content of one virtual pixel (indicated by the leftmost dash line box shown in FIG. 6). To be noted, for the sake of simplification, FIG. 6 does not show any physical pixel, but shows the right angle prisms that form the light-redirecting structure 200, and each right angle prism is corresponding to one physical pixel. Therefore, to facilitate understanding, the right angle prisms shown in FIG. 6 may be regarded as being equivalent to the physical pixels.

In an exemplary embodiment, a plurality of physical pixels providing displayed content of one virtual pixel may be arranged adjacent to each other or spaced apart from each other in the collimated light display structure 100, which may be determined based on the content to be displayed and the display structure.

In order to enhance the feeling that a viewer feels like he/she is in the displayed virtual picture, it is desired that a distance between the viewer and the display penal is as small as possible. According to the principle of stereo imaging shown in FIG. 6, the following equation can be determined:

$$\frac{d}{D} = \frac{L-s}{s},$$

which may be further converted to obtain the following equation:

$$s = \frac{LD}{d+D},$$

where s is a minimum viewing distance from the viewer's eye to the display panel, L is a distance from the virtual image to the viewer's eye, d is a distance between two virtual pixels, and D is a pupil diameter of the viewer's eye.

According to the principle of stereo imaging shown in FIG. 6, it can be determined that a distance p between centers of two adjacent pixels in the collimated light display structure 100 satisfies the following geometrical relationship:

$$\frac{p}{D} = \frac{L-x}{L}.$$

which may be further converted to obtain the following equation:

$$p = \frac{L-x}{L}D,$$

where x is an actual distance from the display panel to the viewer's eye.

Based on the above analysis, it can be determined that the minimum viewing distance s is related to the distance L from the virtual image to the viewer's eye and the distance d between two virtual pixels. Therefore, there are two ways of decreasing the minimum viewing distance s: one is decreasing the value of L, but the value of L shall not be decreased less than a minimum distance at which a viewer's eye can still automatically focus to form a clear and distinct image; and the other is increasing the value of d, but the larger the value of d is, the rougher the virtual image will become. Therefore, values of L and d should be selected under overall consideration.

Figure 7:
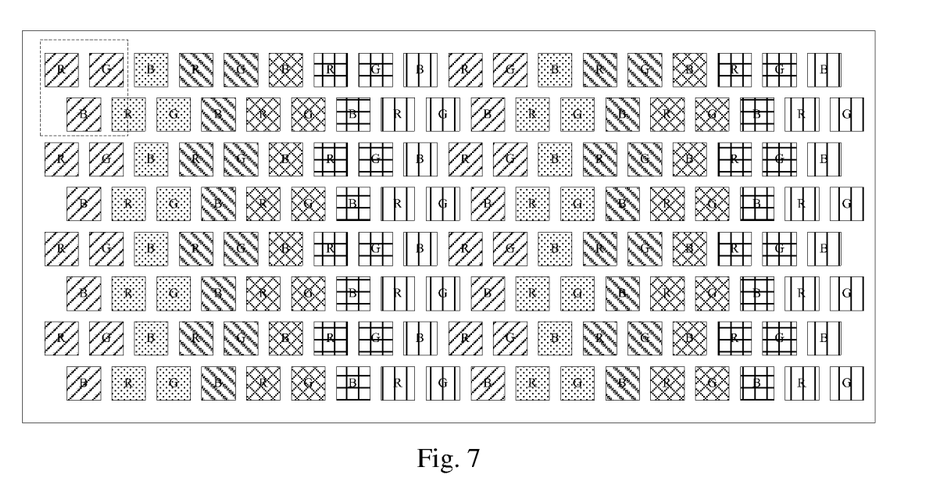
FIG. 7 is an illustrative drawing, showing a distribution of physical pixels in a stereo display panel according to an embodiment of the present disclosure.

In order to display a virtual image having a better quality, in one exemplary embodiment, as show in FIG. 7, every three physical pixels are used to provide displayed content of one virtual pixel, and lines, each of which connects centers of every two of the three physical pixels, form a triangle. To be noted that the three physical pixels may be or not be disposed adjacent to each other.

Based on this inventive concept, the present disclosure further provides a display device. In an exemplary embodiment, the display device includes the stereo display panel described in any one of the above embodiments. The display device may be a mobile phone, a tablet computer, a television, a display, a notebook computer, a digital photo frame, a navigator or any product or component having a display function.

As a conclusion, the present disclosure provides a stereo display panel and a display device having such stereo display panel. By using the stereo display panel or the display device having the stereo display panel, a virtual image seen by a viewer's eye has been moved backward relative to the display panel (that is, a distance between the virtual image and the eye is increased), thus, a stereo visual effect may be achieved, even if the viewer's eye is relatively nearer to the display panel. Moreover, since currently used positive lens, which is thick and heavy, is replaced by the light-redirecting structure to achieve stereo display, the stereo display panel as a whole can be made thinner.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

What is claimed is:

1. A stereo display panel, comprising:
    a collimated light display structure having a first display region configured to display a left-eye image and a second display region configured to display a right-eye image; and
    a light-redirecting structure disposed on a light exit surface of the collimated light display structure, the light-redirecting structure comprising:
        a first portion corresponding to the first display region and configured to deflect a collimated light beam exiting from the first display region towards a predetermined left-eye viewing position, such that a left-eye virtual image seen by a left eye is located at a light incidence side of the collimated light display structure; and
        a second portion corresponding to the second display region and configured to deflect a collimated light beam exiting from the second display region towards a predetermined right-eye viewing position, such that a right-eye virtual image seen by a right eye is located at the light incidence side of the collimated light display structure,
    wherein the collimated light display structure comprises a plurality of physical pixels, and wherein at least two of the physical pixels are configured to provide one virtual pixel of the left-eye virtual image or the right-eye virtual image.

2. The stereo display panel according to claim 1, wherein every three physical pixels are configured to provide one virtual pixel, and wherein connecting lines connecting centers of every two of the three physical pixels form a triangle.

3. The stereo display panel according to claim 1, wherein the light-redirecting structure comprises a plurality of right angle prisms arranged into an array, each of the physical pixels corresponds to at least one of the plurality of right angle prisms, and a right-angle side of each right angle prism abuts against the light exit surface of the collimated light display structure.

4. The stereo display panel according to claim 3, wherein each of the right angle prisms satisfies the following equations:

$$\alpha = \theta_2 - \theta_1, \text{ and}$$

$$n \sin \theta_1 = \sin \theta_2,$$

where $\theta_1$ is an included angle between a slope surface of the right angle prism and the light exit surface of the collimated light display structure, $\alpha$ is a deflection angle of the collimated light beam, $\theta_2$ is an included angle between a direction of the light beam coming out of the slope surface of the right angle prism and the slope surface of the right angle prism, and n is a refractivity of the material of the right angle prism.

5. The stereo display panel according to claim 1, wherein the collimated light display structure comprises a collimated backlight source and a light adjusting structure disposed at a light exit side of the collimated backlight source.

6. The stereo display panel according to claim 5, wherein a direction of the collimated light beam emitted from the collimated backlight source is perpendicular to a plane in which the light adjusting structure lies.

7. The stereo display panel according to claim 5, wherein the light adjusting structure is a liquid crystal panel.

8. The stereo display panel according to claim 1, wherein the collimated light display structure comprises a flat display panel and a collimating structure disposed on a light exit side of the flat display panel, and the collimating structure is configured to collimate light emitted from the flat display panel.

9. The stereo display panel according to claim 8, wherein a direction of the collimated light beam emitted from the collimating structure is perpendicular to a plane in which the flat display panel lies.

10. The stereo display panel according to claim 8, wherein the flat display panel comprises any one of an electroluminescent display panel, a plasma display panel and an electronic paper.

11. A display device, comprising a stereo display panel, wherein the stereo display panel comprises:
    a collimated light display structure having a first display region configured to display a left-eye image and a second display region configured to display a right-eye image; and
    a light-redirecting structure disposed on a light exit surface of the collimated light display structure, the light-redirecting structure comprising:
    a first portion corresponding to the first display region and configured to deflect a collimated light beam exiting from the first display region towards a predetermined left-eye viewing position, such that a left-eye virtual image seen by a left eye is located at a light incidence side of the collimated light display structure; and a second portion corresponding to the second display region and configured to deflect a collimated light beam exiting from the second display region towards a predetermined right-eye viewing position, such that a right-eye virtual image seen by a right eye is located at the light incidence side of the collimated light display structure, wherein the collimated light display structure comprises a plurality of physical pixels, and wherein at least two of the physical pixels are configured to provide one virtual pixel of the left-eye virtual image or the right-eye virtual image.

12. The display device according to claim 11, wherein every three physical pixels are configured to provide one virtual pixel, and wherein connecting lines connecting centers of every two of the three physical pixels form a triangle.

13. The display device according to claim 11, wherein the light-redirecting structure comprises a plurality of right angle prisms arranged into an array, each of the physical pixels corresponds to at least one of the plurality of right angle prisms, and a right-angle side of each right angle prism abuts against the light exit surface of the collimated light display structure.

14. The display device according to claim 13, wherein each of the right angle prisms satisfies the following equations:

$\alpha = \theta_2 - \theta_1$, and $n \sin \theta_1 = \sin \theta_2$, where $\theta_1$ is an included angle between a slope surface of the right angle prism and the light exit surface of the collimated light display structure, $\alpha$ is a deflection angle of the collimated light beam, $\theta_2$ is an included angle between a direction of the light beam coming out of the slope surface of the right angle prism and the slope surface of the right angle prism, and n is a refractivity of the material of the right angle prism.

15. The display device according to claim 11, wherein the collimated light display structure comprises a collimated backlight source and a light adjusting structure disposed at a light exit side of the collimated backlight source.

16. The display device according to claim 15, wherein a direction of the collimated light beam emitted from the collimated light source is perpendicular to a plane in which the light adjusting structure lies.

17. The display device according to claim 11, wherein the collimated light display structure comprises a flat display panel and a collimating structure disposed on a light exit side of the flat display panel, and the collimating structure is configured to collimate light emitted from the flat display panel.

18. The display device according to claim 17, wherein a direction of the collimated light beam emitted from the collimating structure is perpendicular to a plane in which the flat display panel lies.

* * * * *